Jan. 10, 1939.   J. MASON   2,143,823
BEVERAGE DISPENSING APPARATUS
Filed May 20, 1936   2 Sheets-Sheet 1

INVENTOR.
JOHN MASON
BY
ATTORNEY.

Jan. 10, 1939.　　　　　　J. MASON　　　　　　2,143,823
BEVERAGE DISPENSING APPARATUS
Filed May 20, 1936　　　　2 Sheets-Sheet 2
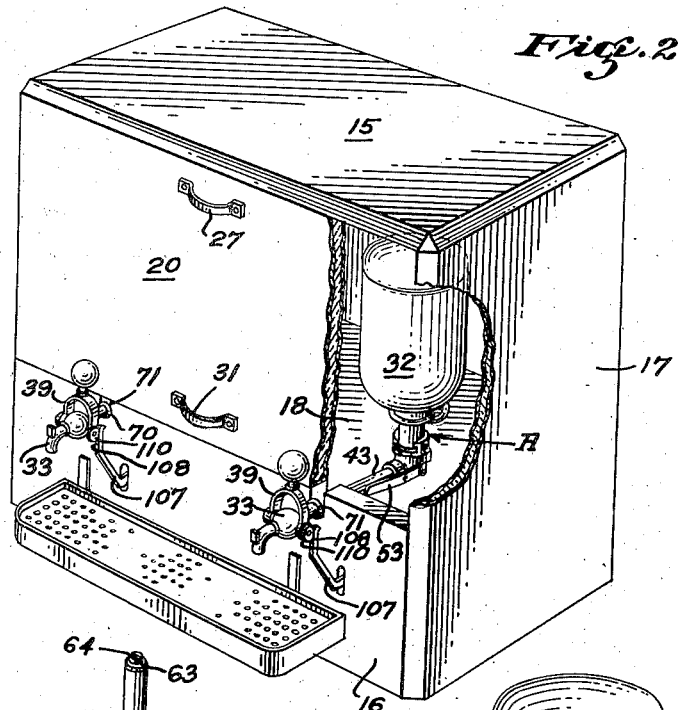
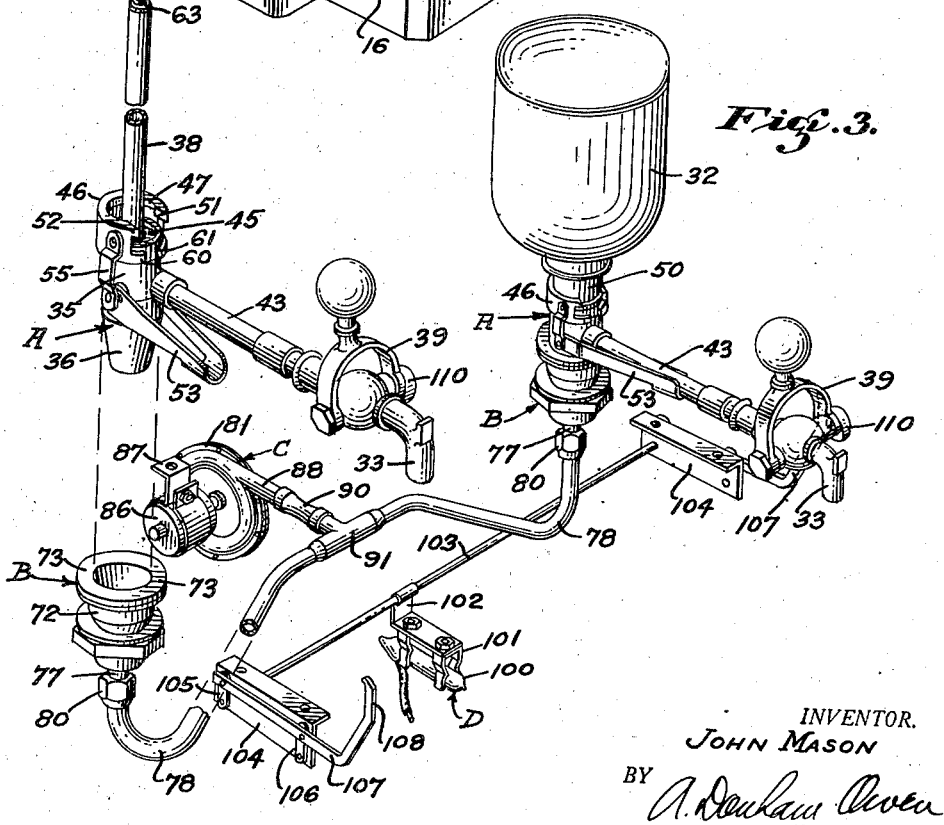
INVENTOR.
JOHN MASON
BY
ATTORNEY.

Patented Jan. 10, 1939

2,143,823

UNITED STATES PATENT OFFICE 2,143,823

BEVERAGE DISPENSING APPARATUS

John Mason, San Raphael, Calif., assignor to J. H. Threlkeld and M. C. Threlkeld, both of San Francisco, Calif.

Application May 20, 1936, Serial No. 80,797

17 Claims. (Cl. 225—1)

My invention relates to devices for dispensing a beverage and for preserving the beverage in proper palatable condition.

It is a well known fact that certain beverages such as beer are more palatable and invigorating when their carbonic acid gas content is from .024 to .032 per cent. Beer is considered to be "stale" if the percentage of carbonic acid gas is below .024 per cent, and when the percentage of said gas exceeds .032 per cent it is "wild" and foamy and difficult to handle. This latter situation is due primarily to the low solubility of the carbonic acid in the beverage after the release of the pressure thereon during the dispensing operation. It is highly desirable that a suitable air pressure be maintained in barrels or kegs containing beer or other similar beverages so that the carbonic acid gas is not allowed to leave the beverage. At the present time, kegs or barrels are used as containers when large quantities of beer are being dispensed, and suitable artificial air pressure is provided inside the keg to prevent the carbonic acid gas from leaving the beer and to force the latter to the dispensing valve. The use of bottles and cans for containing and dispensing beer is favored over other types of containers, principally because of the lower manufacturing and maintenance costs. The use of such containers as siphon type bottles for dispensing beer or other beverages of a similar nature is not practical because of the excessive foaming thereof when the pressure is released during the dispensing operation. The use of large glass bottle containers or cans for beer or similar beverages instead of the commonly used kegs or barrels would be extended considerably if suitable apparatus were available to permit the proper dispensing of a number of small portions of the beverage at various intervals without the accompanying loss of carbonic acid gas from that part of the beverage remaining in the container.

Another problem facing the seller of this type beverage is that of purchasing and maintaining expensive equipment which heretofore has been required.

It is therefore the object of my invention to provide an inexpensive, portable dispensing apparatus adapted to receive the smaller type container; to provide a dispensing machine which is simple to operate and has few parts; to provide a dispensing machine which requires no expensive servicing and therefore is cheap to maintain; to provide a beverage dispensing machine with means permitting quick dismantling of the beverage container and faucet structure as a unit, whereby the beverage container may be removed from said faucet structure and a new container replaced thereon when the whole removable unit is outside the machine; to provide a beverage dispensing machine having faucet and container units, separable as units without severing any connections which pass liquid; to provide a beverage dispensing machine of the type last mentioned so that reserve units may be kept on hand ready to immediate substitution in the dispenser; to provide a dispensing machine which automatically maintains enough pressure on the beverage to avoid any loss of gases from the beverage; and to provide a beverage dispensing machine which admits additional pressure over the beverage substantially only at the time some of the beverage is being withdrawn at the faucet; to provide a beverage dispensing machine employing a type of compressor which, though remaining in operation, cannot over-compress the beverage.

Other objects and advantages of my invention will be pointed out in the following description.

In the accompanying drawings forming a part of this specification, in which like numerals are employed to designate like parts throughout the same:

Fig. 2 is a perspective view with a portion of a corner of the case broken away to disclose the beverage receptacle;

Figures 1, 4:
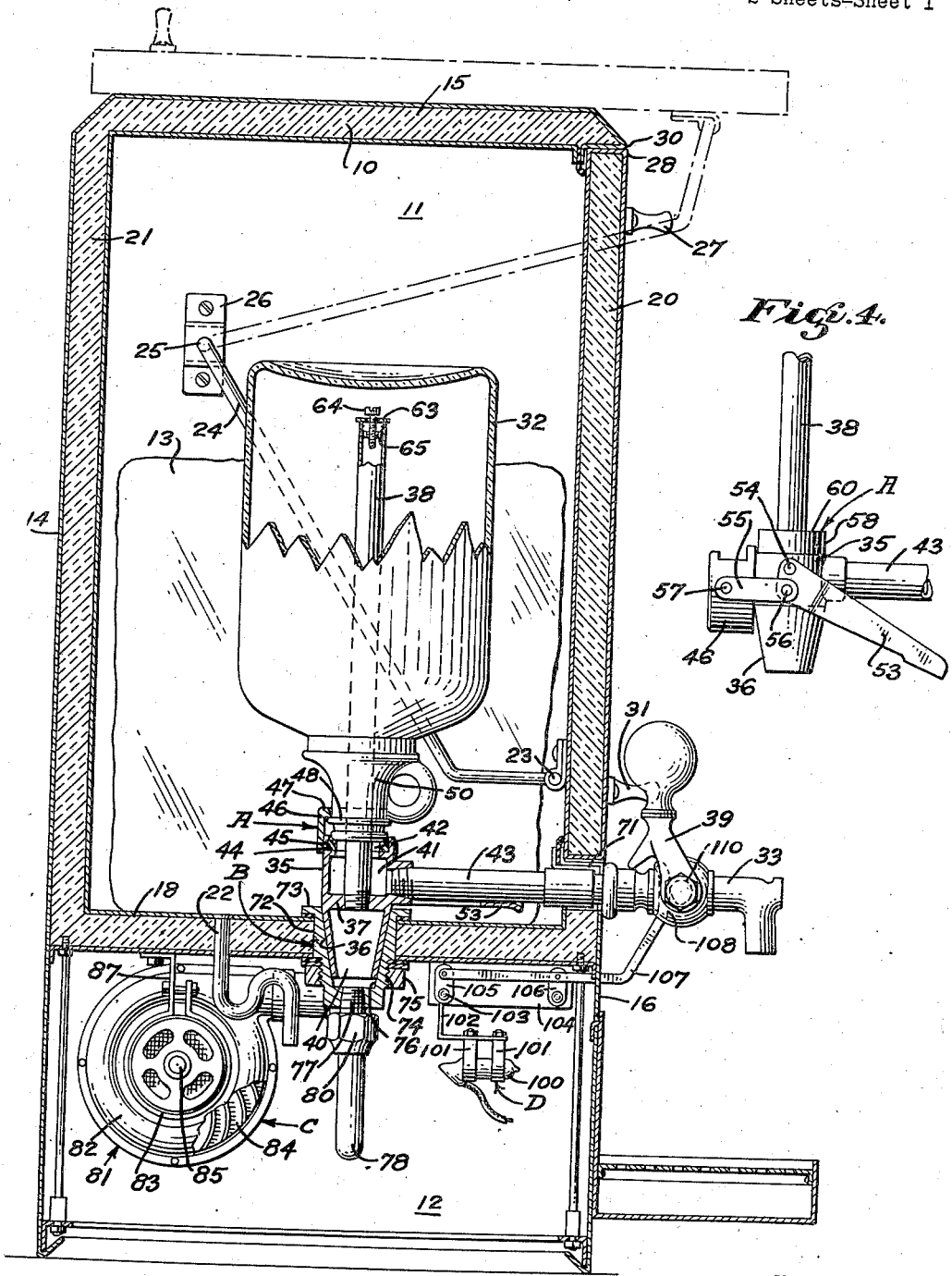
Fig. 1 is a cross-section elevation of the assembled machine with the lower part of the bottle and with the faucet not shown in cross-section.

Fig. 3 is a perspective view of all the parts of my device with the cabinet in which they are fitted omitted and with one of the faucet and coupling structures elevated above its cooperating part, and with dotted lines indicating the path followed in engaging the male and female members of the coupling; and Fig. 4 is a side view of the male coupling member with the container removed and the latch released.

The elements making up the beverage dispenser are mounted in an insulated cabinet generally designated by the numeral 10. This cabinet which may be of metal, Bakelite, wood or other suitable material, is comprised of an upper chamber 11, and a lower chamber 12. The latter houses the compressor unit and operating parts, the former houses the beverage container and whatever cooling means may be provided. While I have shown provision in the upper portion of the cabinet for the use of ice 13 as a refrigerant, it is obvious that other cooling means may be provided.

The upper portion of the cabinet comprises the back wall 14, top wall 15, lower front wall 16, and end walls 17. The bottom of the upper portion of the cabinet has a floor 18. Access to the upper portion of the cabinet is gained by means of a door 20, adapted to fit snugly in the opening in the front of the cabinet. These walls 14, 15 and 18, and the door 20 are padded or sealed with an insulating material 21 of any suitable material, and provide a substantially air-tight upper closure. A drain 22 in the bottom wall 18 conducts the melted water into the lower compartment 12, from whence it can be disposed of into a nearby drain.

The general construction of the cabinet and cabinet door is the subject of another application and is no part of the present invention, but I may say briefly that the door 20 is hinged on each side at 23 to parallel rods 24, which are in turn hinged at 25 in plates 26 secured to the inside end walls 17 of the container. The door is opened by pulling on the handle 27 until the upper edge 28 of the door clears the forward edge 30 of the cabinet. Then by lifting on the lower handle 31 the door slides up over the top 15 and comes to rest on it as shown in dotted lines in Fig. 1.

My invention is concerned with the removable unit A comprising the beverage container 32, the faucet 33 and coupling unit 34; the female coupling unit B, compressor unit C, and circuit breaker unit D. In Fig. 3, one of the A units is shown lifted out of the coupling unit B, while the other A unit is in assembled position, with the beverage container 32 in place.

The removable unit A is made up of a housing 35, having a tapered depending portion 36, partition 37, with an upstanding tube 38 threaded therein and in communication with the outlet or orifice 40 formed by the tapered portion 36. Annular pocket 41 is formed in the housing 35 above partition 37 with an opening 42 in its upper side and a threaded opening in its side adapted to receive the faucet pipe 43. The pipe 43 is in unobstructed communication with the pocket 41 and the opening 42. A second annular pocket 44 is formed in housing 35 above opening 42 and has a rubber gasket 45 fitted therein and adapted to receive the lip or mouth edge of the beverage container 32 which may be a bottle, can, keg or tank. To secure the beverage container 32 in fluid type contact with the housing 35 I provide a split ring 46 having a flange 47 around its upper edge which flange is adapted to engage with a projection 48 on the container neck 50. The opening in the split ring between the ends 51 and 52 is sufficient to clear the neck 50.

The split ring 46 must be provided with means for securing it on the housing 35 so that its flange 47 bears against rim 48 on container neck 50 and establishes a leak-tight joint between the mouth of the container and the gasket 45. This may be accomplished by means of a screw thread-cut on the outside of housing 35 and a corresponding thread on the inside of split ring 46, but I prefer to provide a lever arrangement as shown (see Figs. 3 and 4) as this arrangement enables a quick detachment of an empty container and attachment of a full one. The lever 53 is pivoted to the housing 35 on oppositely disposed integral studs 54. Short links 55 are pivoted to lever 53 at 56, and to split ring 46 at 57. As the lever 53 (see Figs. 3 and 4) is swung downwardly and to the left the effect will be to lift split ring 46 above the upper edge 60 of housing 35, thus releasing the vise-like grip on rim 49 of bottle neck 50. When lever 53 has been swung to the left far enough to raise split ring 46 so it will clear ledge 60, split ring 46 can be then swung off of bottle neck 50, and if desired, will fall down into a position similar to that shown in Fig. 4. Of course, this change takes place when the bottle is resting on the floor or on a table, and with its neck portion 50 at the top so that the contents will not be spilled.

In order to guide the split ring 46 in its movement along the neck 58 of housing 35, the annular extensions 61 and 62 extend toward each other with a clearance therebetween just sufficient to clear the tube 38.

On the top end of tube 38 I provide a flap type valve 63 which may be made of pure gum rubber or a material having similar characteristics, and is held in place by means of screw 64 threaded into a perforated bar 65 secured inside and across the upper end of tube 38. By regulating the screw 64 the pressure on the valve 63 can be varied for the purpose hereinafter described.

The horizontal pipe 43 secured in the housing 35 has a faucet 33 connected to its outer end to control the passage of liquid from the interior of container 32. Suitable bushings 70 of rubber or other material may be placed around pipe 43 to secure a tight fit in the notch 71 where it passes through the cabinet wall 16.

The B unit or female coupling member comprises a flanged fitting 72 formed with flange 73 at one end and external threads 74 at the other end. A clamping nut 75, fitted to said threads, rigidly secures the unit 72 in the base 18 of the cabinet. The inner opening in unit 72 has tapered walls 76 which preferably are ground to fit the taper 36 on housing 35. The bottom of unit 72 is tapped to receive a nipple 77. To the lower end of this nipple 77 is secured tubing 78 by means of clamping nut 80.

The C unit or compressor 81 forms a convenient source of gas under pressure and may be of the blower or centrifugal type which comes up to a constant pressure and will not go beyond that no matter how long it runs. Its housing 82 is secured to the end of the motor housing 83. The rotor 84 is secured to the end of the motor shaft 85 and is driven thereby. The motor 86 may be secured in position on the bottom of the cabinet 13 by means of strap bracket 87. The exhausting end 88 of the compressor is connected to the tube 78 by means of a flexible tube 90 and in the case of a two unit installation, as illustrated, by a T member 91 (see Fig. 3). The resilient, flexible connector 90 eliminates vibration.

The D unit or circuit control means may be of any conventional form although I prefer to use a mercury type device indicated generally by the numeral 100. I have not illustrated the circuit in detail as the wiring of said switch to the electric motor 86 would be well known to those skilled in the art.

The opening and closing of the motor circuit is effected by the tilting of mercury tube 100, and this tilting is in turn controlled by the opening and closing of faucet 33 by means of handle 39. Mercury tube 100 is held in clamps 101 fastened to the end of a lever 102, said lever being rigidly secured to shaft 103. Shaft 103 is mounted for rotation in angle plates 104. The upper ends of levers 105 and 106 are loosely pivoted to a rod 107 which has a face 108, adapted for engagement with cam face 110 on faucet handle 39. Cam 110 is shaped so that the forward opening of handle 39, in addition to opening the faucet and allowing liquid to flow from the container 32, transmits an inward movement to rod 107, thereby causing a rotary movement of lever 102 which effects a tilting of mercury tube 109, closing the motor circuit to operate the compressor 81. When the faucet handle 39 is moved to close the faucet, cam face 110 allows rod 107 to move forward and shuts off the motor circuit when the mercury tube 110 assumes its horizontal position.

Operation

Assume that the device has been in use and one or both of the containers 32 has been emptied. The operator places one hand on handle 27 and the other hand on handle 31, and by means of handle 27 pulls the upper edge of the door clear of the top edge 30. He then lifts on handle 31, causing the door to swing upwardly on hinge 24 until it rests on the flat top 15. This exposes the interior of the refrigerated compartment 11, and allows free access to the icing compartment and to the removable unit A.

The operator next grasps the unit A by placing one hand under the lever 53 and pipe 43, and the other hand steadies the container 32 as this complete unit is lifted out of the cabinet. The ground face tapered coupling 36—76 is maintained by gravity, and therefore separates easily upon lifting the removable A unit as described. The operator next inverts the unit allowing the container 32 to rest on its bottom on a suitable flat surface. While one hand rests on pipe 43 to steady the unit, the other hand grasps lever 53 and rotates it approximately 180° in which position the housing 35 will have been lifted clear of the mouth of container neck 50. The operator releases his hold on the lever 53, grasps the split ring 46 and pulls it in the direction to which the lever now points causing it to swing on the levers 55 to a position away from the neck 50 of the container. The whole removable unit A is now lifted out of the bottle and inserted in a full bottle which may be alongside. The above operations are now repeated in reverse sequence, and the full container 32 secured to the removable unit A. The operator now places one hand under the bottle, and with the other hand grasping the pipe 43, the unit is inverted, placed in the refrigerated cabinet chamber 11 and lowered until the male tapered surface 36 is fitted to the female member 76 with an air-tight joint. As the unit was lowered into position, the pipe 43 passed to the bottom of slot 71 in the front cabinet section 16.

As the full container 36 was uncorked only an instant previous to its being coupled to the unit A, a negligible loss of gas will have occurred, so that under normal circumstances, the rotation of compressor 81 will not be required until some of the liquid is withdrawn through the faucet. This withdrawal will effect an operation of compressor 81 by means of the switch mechanism described above.

As each drink is withdrawn through the faucet 33, the compressor will be set in operation and will force air through flexible coupling 90, tube 78, nipple 77, orifice 40, and tube 38 into the container 32. By regulating the tension on gum washer 63 the amount of additional air to be admitted into the container in this way can be controlled. Likewise, the gum washer 63 forms a check valve on the end of tube 38 to hold whatever pressures build up in the container and to prevent their dissipation into the compressor when it is inoperative.

It is obvious that the device lends itself to embodiment in single as well as multiple unit dispensers, and I have chosen for this illustration a two unit embodiment.

This application is a continuation in part of my copending application Serial No. 35,820, filed August 12, 1935.

What I claim is:

1. Beverage dispensing apparatus comprising an inverted beverage container, a housing member having a chamber therein into which the neck of the container is adapted to fit, packing means fitting adjacent the neck of the container for preventing the flow of beverage from the chamber except through a discharge orifice in the housing member which communicates with said chamber, a tube extending into said container, a fan for forcing currents of air under pressure through the tube and into the container, an electric motor for operating the fan, a dispensing valve communicating with the discharge orifice of the housing member, a normally open switch connected in the electrical circuit leading to the motor, and means actuated by the valve when the latter is turned to an open position for closing the switch.

2. Beverage dispensing apparatus comprising an inverted beverage container, a housing member adapted to receive the neck of the container, the said housing member having a discharge orifice communicating with the opening in the neck of the container, means for directing compressed air into the container, a dispensing valve secured to the housing member and in communication with the discharge orifice, a fan positioned to discharge air currents into the air directing means, a motor for operating the fan, and a switch connected in the circuit to the motor and adapted to be closed by the valve when the latter is opened.

3. Beverage dispensing apparatus comprising a support, an inverted liquid container mounted on the support, a dispensing valve for controlling the flow of liquid from the container, means for discharging compressed air into the container, an electrical motor for operating said air discharging means, an electrical make and break device connected in the circuit leading to the motor, having a normally open contact switch, a control rod to actuate the latter and cam means on the valve, and engaging with the control rod, the said cam means being adapted to be actuated by the opening of the valve so as to move the control rod to a position whereby the circuit is closed.

4. In a dispenser having means for simultaneously controlling the flow of compressed air into a container, whenever the flow control means is opened to allow the flow of a liquid therefrom, an electric fan for directing currents of air under pressure, a motor for operating the fan, a normally open switch connected in the electrical circuit leading to the motor, means for receiving currents of air created by the fan and for directing them into the container, and means actuated by the flow control means when the same is open for closing the switch.

5. In a liquid dispenser of the type adapted for maintaining carbonated beverages under a predetermined pressure and in condition to be dispensed without excessive agitation or loss of gaseous content, the combination of a container, a housing having an outlet opening therein, a faucet connected into said outlet, means for coupling said container to said housing, a source of air under pressure which is above atmospheric pressure, means for conducting said air under pressure into said container without contact with the liquid therein, means for preventing release of air pressure in said container through said conducting means and means for activating and stopping said source of air under pressure substantially simultaneously with the opening and closing respectively of said faucet, whereby the pressure within said container is replenished whenever said faucet is opened.

6. In a liquid dispenser of the type adapted for maintaining carbonated beverages under a predetermined pressure and in condition to be dispensed without excessive agitation or loss of gaseous content, the combination of a container, a housing having an outlet opening therein, a faucet connected into said outlet, means for coupling said container to said housing, a centrifugal fan capable of creating air under pressure above atmospheric pressure and within predetermined limits, means for conducting said air under pressure into said container without contact with the liquid therein, means for preventing release of air pressure in said container through said conducting means and means for activating and stopping said source of air under pressure substantially simultaneously with the opening and closing respectively of said faucet, whereby the pressure within said container is equalized with the pressure from said source whenever said faucet is opened.

7. In a beverage dispensing machine of the type adapted to keep the contents of the container under a predetermined pressure, the combination of a compressor adapted to exert a predetermined pressure, means for rotating said compressor, a container, a coupling having two chambers separated by a partition therein, one of which is connected to the mouth of said container, means connecting said compressor to the other of said chambers, a tube fastened in said partition and communicating at one end with said compressor connected chamber and with its other end extending into said container substantially to the end opposite the container mouth, a valve disposed in said tube near said last-named end, said valve on one side being subject to the pressure in said container and on the other side to the predetermined pressure from said compressor and means for regulating the seating pressure on said valve apart from the above forces, whereby it can be made to resist effectively the entry of further medium under pressure from said compressor when the pressure in said container with the assistance of the tension in the valve member exceeds the compressor pressure.

8. In a beverage dispensing machine of the type adapted to keep the contents of the container under a predetermined pressure when sealed and when dispensing liquid therefrom, the combination of a supporting framework, a coupling member arranged in said framework, a compressor means connected to said coupling, and a beverage dispensing unit adapted to be coupled detachably to the aforementioned coupling, said detachable unit comprising a beverage container, a housing having an orificed coupling member thereon, means for detachable securing said container on said housing, a pipe connected at one end to said housing, a dispensing faucet secured to the other end of said pipe, means on said faucet for setting said compressor in operation whenever said faucet is opened, a second pipe with one end secured in one wall of said housing and communicating with said orifice and with its other end extending into said container, said detachable unit being removable as a complete sub-assembly when it is desired to replace said beverage container and without requiring the severance of any liquid flow joint for removal.

9. A detachable beverage dispensing sub-assembly unit adapted for gravity coupling to a female orificed coupling mounted in a supporting framework, the orifice in said coupling being connected to a compressor means, said detachable unit comprising a beverage container having a mouth thereon, a twin-chambered housing having a depending orificed male coupling member in communication with one of said chambers, means for detachably securing the mouth of said container to the other chamber of said housing, a dispensing faucet also secured to said housing and opening into the chamber in said housing which is in communication with said container mouth, and a tube passing through the last-mentioned chamber in said housing and having one end opening into the orifice in the other chamber of said housing coupling member and its other end extending into said container.

10. A detachable beverage dispensing sub-assembly unit adapted for gravity coupling to a tapered female orificed coupling mounted in a supporting framework, the orifice in said coupling being connected to a compressor means, said detachable unit comprising a beverage container having a mouth thereon, a twin-chambered housing having a depending tapered orificed male coupling member in communication with one of said chambers, means for detachably securing the mouth of said container to the other chamber of said housing, a dispensing faucet also secured to said housing and opening into the chamber in said housing which is in communication with said container mouth, and a tube passing through the last-mentioned chamber in said housing and having one end opening into the orifice in the other chamber of said housing coupling member and its other end extending into said container.

11. A coupling faucet assembly adapted for attachment to the mouth of a container for controlling the withdrawal of liquid therefrom comprising a twin-chambered housing having a coupling portion communicating with the chamber in its lower side and a mouth receiving rim in its upper side in communication with the upper chamber, a partition between said chambers, a tube extending through said partition and in communication with the lower chamber, a faucet connected into said upper chamber, a split-ring slidable along said housing when in position around said mouth receiving rim therein, said split-ring having a flange for engaging a cooperating portion on the neck of a container, a lever pivoted to said housing on an axis substantially parallel with the face of said rim, and a pair of levers pivoted at one end to said last-named lever and at their other ends to said split-ring whereby the movement of said split-ring toward and away from said opening may be controlled.

12. In a beverage dispensing machine of the type adapted to keep the contents of the container under a predetermined pressure when sealed and when dispensing liquid therefrom, the combination of a supporting framework, a coupling arranged in said framework, a compressor means connected to said coupling, means for operating said compressor means and a beverage dispensing unit comprising a housing adapted to be coupled detachably to the aforementioned coupling, lever operated means for detachably securing said container on said housing, a pipe connected at one end to said housing, a dispensing faucet secured to the other end of said pipe, a second pipe with one end secured in one wall of said housing and communicating with said coupling opening and with its other end extending into said container, said detachable unit being removable as a complete sub-assembly when it is desired to replace said beverage container and said lever operated means being operable to release said container only when said sub-assembly unit is uncoupled from its supporting framework and coupling.

13. A detachable beverage dispensing sub-assembly unit adapted for gravity coupling to a female coupling mounted in a supporting framework, the orifice in said coupling being connected to a compressor means, said unit comprising a beverage container having a mouth, a chambered housing having a flange surrounding an opening therein and also having a depending male coupling member, lever operated means for detachably securing the container mouth to the flange in said housing, a dispensing faucet also secured to said housing and opening into the chamber in said housing which is in communication with said container, and a tube passing through said housing with one end opening into the orifice in said housing coupling member and the other end extending into said container.

14. A detachable beverage dispensing sub-assembly unit adapted for gravity coupling to a female orificed coupling mounted in a supporting framework, the orifice in said coupling being connected to a compressor means, said unit comprising a beverage container having a mouth thereon, a twin-chambered housing having a depending orificed male coupling member in communication with one of said chambers, lever operated means for detachably securing the mouth of said container to the other chamber of said housing, a dispensing faucet also secured of said housing and opening into the chamber in said housing which is in communication with said container mouth, and a tube passing through the last-mentioned chamber in said housing and having one end opening into the orifice in the other chamber of said housing coupling member and its other end extending into said container, said lever being arranged so that it will only release said container when said unit is removed from said coupling and framework.

15. In a beverage dispensing machine, a structure forming a compartment adapted to be refrigerated, a coupling member carried by said structure at the lower part of the compartment, means forming a source of gas under pressure connected to said coupling member; and a beverage dispensing unit adapted to be detachably coupled to the aforementioned coupling member, said detachable unit comprising a beverage container adapted to be disposed within said compartment, a housing having a second orificed coupling member, both said coupler members being adapted to make connection with each other when one member is thrust against the other, means for detachably securing said housing to one wall of said container, a pipe having its one end connected to said housing, a dispensing faucet secured to the other end of said pipe, a second pipe having one end of the same secured to said housing and communicating with the orifice in the second coupling member, said pipe extending upwardly into said container with its upper end communicating with the container, said detachable unit being removable as a complete sub-assembly by movement of the same with respect to said structure when it is desired to replace said beverage container, and without requiring the severance of any liquid flow joint for removal.

16. In a beverage dispensing machine, the combination of a supporting structure, a coupling member carried by said structure, means forming a source of gas under pressure connected to said coupling; and a beverage dispensing unit adapted to be gravity coupled detachably to the aforementioned coupling, said detachable unit comprising a beverage container, a housing having an orificed coupling member, both said coupling members being adapted to make connection with each other when one member is thrust against the other, means for detachably securing said housing to said container, a pipe connected at one end to said housing, a dispensing faucet secured to the other end of said pipe, a second pipe with one end secured in one wall of said housing and communicating with the orifice in said second-named coupling member and with its other end extending into said container, said detachable unit being removable as a complete sub-assembly when it is desired to replace said beverage container, and without requiring the severance of any liquid flow joint for removal.

17. In a beverage dispensing machine, the combination of a supporting structure, a coupling carried by said structure, means forming a source of gas under pressure connected to said coupling, and a beverage dispensing unit adapted to be coupled detachably to the aforementioned coupling, said detachable unit comprising a beverage container, a housing having a second orificed container, a housing having a second orificed coupling member thereon, means for detachably securing said housing to said container, a pipe connected at one end to said housing, a dispensing faucet secured to the other end of said pipe, a second pipe with one end secured in one wall of said housing and communicating with the orifice in the second coupling member and with its other end extending into said container, said detachable unit being removable as a complete sub-assembly when it is desired to replace said beverage container and without requiring the severance of any liquid flow joint for removal.

JOHN MASON.